United States Patent [19]
Frantz

[11] 3,868,161
[45] Feb. 25, 1975

[54] ELECTRICAL COMPONENT
[75] Inventor: Robert Houston Frantz, Carlisle, Pa.
[73] Assignee: AMP Incorporated, Harrisburg, Pa.
[22] Filed: Oct. 1, 1973
[21] Appl. No.: 402,549

[52] U.S. Cl. .................. 339/14 R, 339/97, 339/164
[51] Int. Cl. ........................... H01r 3/06, H01r 9/06
[58] Field of Search ............ 339/95, 96, 97, 98, 99, 339/14, 164, 206

[56] References Cited
UNITED STATES PATENTS

| | | | |
|---|---|---|---|
| 2,673,968 | 3/1954 | Smith | 339/99 R |
| 3,012,219 | 12/1961 | Levin et al. | 339/98 |
| 3,183,472 | 5/1965 | Pawl | 339/94 |
| 3,555,492 | 1/1971 | Smith | 339/95 D |
| 3,663,924 | 5/1972 | Gerlat | 339/99 R |
| 3,671,925 | 6/1972 | Drapkin | 339/95 D |
| 3,718,888 | 2/1973 | Pasternak | 339/98 |

*Primary Examiner*—Roy D. Frazier
*Assistant Examiner*—Robert A. Hafer

[57] ABSTRACT

An improved electrical component is disclosed which may be rapidly connected to wires without the need of special tools. The back cover of the component housing includes a number of integral wire carrying members which are movably attached to the cover and arranged to drive wires carried thereby onto metallic lances of the contact members of the component without the aid of special tools. The metallic contact members include two identical interconnected ends which are arranged to be separated by removing a tear strip therebetween so that the ends of the contact can be individually wired. this tear strip is removed simply by pulling with a pair of pliers or the like.

15 Claims, 8 Drawing Figures

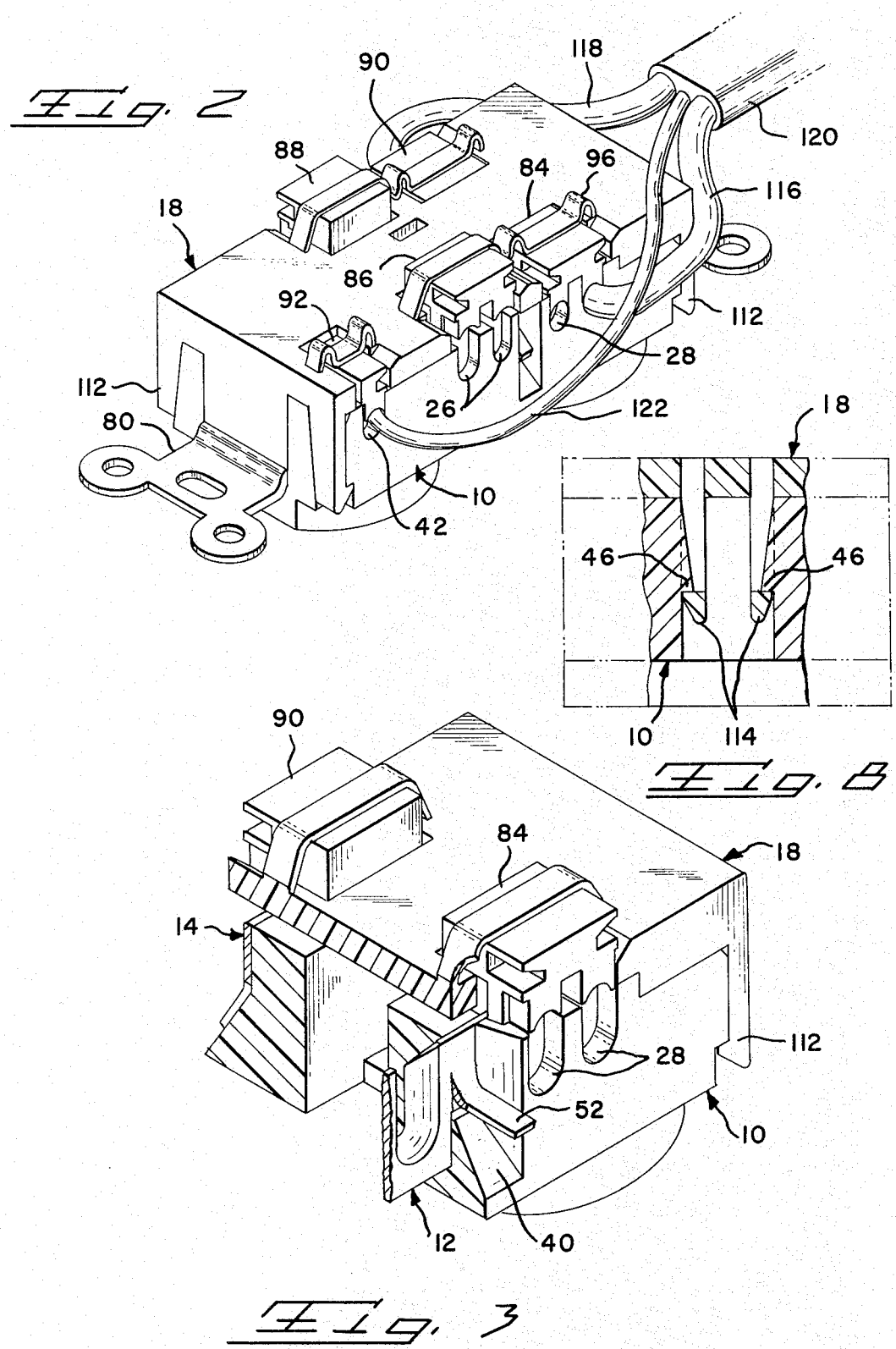

ELECTRICAL COMPONENT

BACKGROUND OF THE INVENTION

1. The Field Of The Invention

The present invention relates to an improved electrical component and in particular to a component which can be easily wired and in which portions of the component may readily be electrically separated for individual wiring.

2. The Prior Art

In accordance with long standing conventional practice, electrical wires have been connected in junction boxes and/or outlet boxes which are installed on studding prior to the application of the final wall covering. Wires in conduits or cables are led into opposite sides of the junction box and initially left disconnected. After application of the final wall covering, such as plaster or wall board, the switches or outlets are installed in the boxes.

At present, most buildings are wired with a three wire system and it is frequently necessary to run as many as four three-wire cables into a single junction box, which requires the stripping and connection of twelve individual wires. To prepare the wires for connection with conventional components, it is necessary to strip the outer insulation from the main cable and then strip the insulation from the ends of the current carrying wires. The stripped ends are then bent and fastened, by individual screws, to a switch or receptacle which is then forced into the box with sufficient force to overcome the resistance to bending, twisting and folding of the excess cable confined in the junction box. This is an extremely awkward and time consuming operation and inherently involves the possibility of breaking insulation or loosening prior connections with the attendant possibility of an open circuit or a dangerous short circuit. This problem has been magnified by the rapidly increasing cost of labor as well as increasing demand for extra convenience outlets. At present, for example, the average small home may have about twenty to twenty-five duplex receptacles and eight to fifteen switches. In addition, before the final approval of a wiring job, it is often necessary to retrace entire circuits to assure the accuracy of the individual connections.

One attempt to overcome some of the above mentioned problems is set out in U.S. Pat. No. 3,510,822. The electrical connector described this patent has three fastener or connector assemblies which are in the form of hollow rectangular frames with a screw threaded into one end of the frame. The stripped ends of a number of wires are inserted into the frame and clamped therein by turning in the screw. However, this connector still requires stripping of the ends of the wire and application of a screw.

Another approach to solving the above discussed problems is found in U.S. Pat. No. 3,671,925. This patent discloses an electrical receptacle using pressure lock terminals to obviate the use of screws to secure a bare conductor. These pressure lock terminals grasp a portion of a bare conductor wire and secure it in place by means of a resilient pressure member and thus do not require the use of a screw terminal. These receptacles are somewhat faster to use than those with screw terminals since the bare conductor is simply forced through an opening. However, these receptacles still require the ends of the wire to be stripped and they cannot always handle all sizes of wire and/or several wires at a time. The sockets of the disclosed receptacle can be separated by bending a tab back and forth until it is broken off. This job is accomplished with a pair of pliers or the like and can be difficult in cramped quarters, as well as time consuming.

The next significant development in the connection of wires to electrical components is represented by U.S. Pat. No. 3,723,948. This patent discloses an electrical component which is provided with a base housing channeled to receive and separate three wires while maintaining substantially equal tension on each of the wires. The outermost channels are oppositely arcuate to permit each of the wires to be positively aligned with the appropriate slot in an associated connector plate. The connections are made by forcing the unstripped wire between upstanding legs of the conductor plates which define a slot therebetween.

The above mentioned idea of forcing an insulated wire between a pair of closely spaced tine members, which will pierce the insulation to make contact with the conductor of the wire, is well known. The wires can either be forced between pairs of rigid tines by an insulating member, as shown in U.S. Pat. No. 3,183,472, or a metallic member bearing spaced rigid tines can be forced down over the wire which is trapped in an insulating block, as shown in U.S. Pat. No. 3,012,219.

SUMMARY OF THE INVENTION

The subject electrical component includes a housing, a pair of contact members and a ground contact yoke member mounted in said housing and a rear cover for said housing. The rear cover includes a number of integral wire carrying members which are movably connected to the remainder of the cover by flexible straps. Each wire carrying member includes at least one blind bore and an intersecting transverse groove into which tines of the contact members can protrude. Each of the contact members includes a tear strip portion interconnecting two end portions which are complete contact units. The housing is profiled to allow access to the tear strip and to provide a pair of spaced anvils on either side of the tear strip to restrain the contact member as the tear strip is removed. The yoke member includes ground contact members adapted to receive the ground contact of mating plugs and a pair of tines for engaging a ground wire therebetween.

It is therefore an object of the present invention to produce an improved electrical component which may be readily and rapidly connected to associated wiring by inserting wires into a carrier member and pushing the carrier member into the housing to effect engagement with contacts mounted therein without first stripping the ends of the wire.

It is a further object of the present invention to produce an electrical component, such as a duplex receptacle, switch, bus bar, splice, etc., which can be rapidly connected to associated wiring without prestripping the wire before effecting the connection.

It is also an object of the present invention to produce an electrical component in which the contact members can be readily and easily separated into individual units by simply removing a tear strip.

It is a further object of the present invention to produce an electrical component which may be readily and economically produced.

BRIEF DESCRIPTION OF THE DRAWINGS

FIG. 2 is a view similar to FIG. 1 showing the duplex receptacle closed and connected to the wires of a single cable;

FIG. 3 is a perspective view taken along the section line 3—3 of FIG. 2 showing detail of the tear strip;

FIG. 4 is an enlarged partial side elevation showing a tear strip and a wire carrier;

FIG. 5 is a side elevation, similar to FIG. 4, showing a wire carrier fully inserted into the housing;

FIG. 6 is a vertical section taken along line 6—6 of FIG. 5;

FIG. 7 is a horizontal section taken along line 7—7 of FIG. 5; and

FIG. 8 is a partial transverse vertical section through the receptacle showing the central locking mechanism.

DETAILED DESCRIPTION OF THE PREFERRED EMBODIMENT

Figure 1:
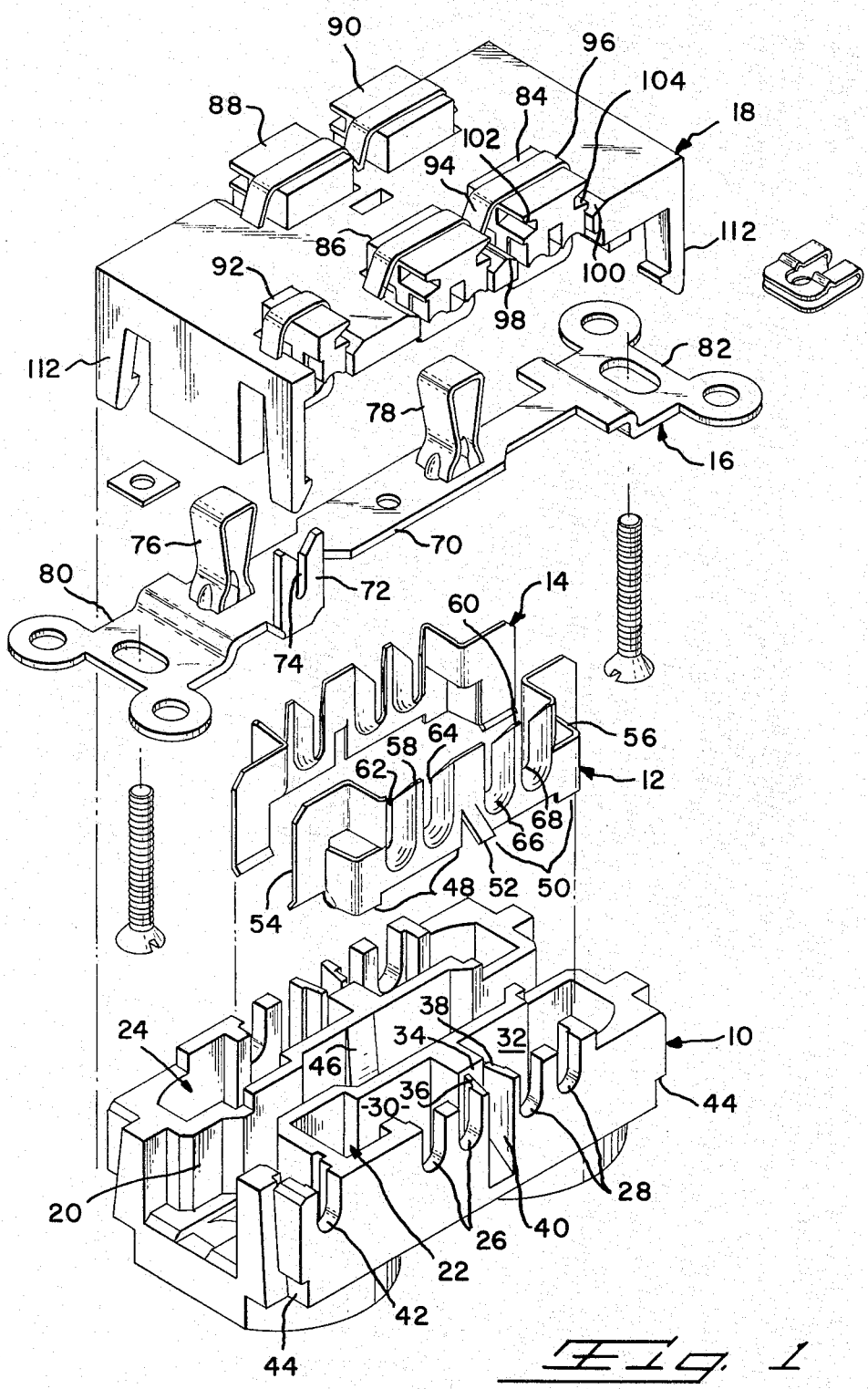
FIG. 1 is an exploded rear perspective view of the subject invention embodied in a duplex receptacle.

The subject improved electrical component has been illustrated, for sake of convenience, embodied in a duplex receptacle. This is in no way to be considered as a limitation on the scope of the invention since it likewise can be incorporated into switches, bus bars, splices, etc. The illustrated embodiment comprises a housing 10, contact members 12, 14, a ground yoke member 16, and a back cover 18. The housing 10 includes a longitudinally extending central channel 20 which is adapted to receive the ground yoke member 16. On either side of the central channel there is a profiled recess 22, 24 each of which receives a contact member 12, 14, respectively, therein. The contacts 12, 14 and recesses 22, 24 are substantially identical in configuration and therefore only contact 12 and recess 22 will be discussed in detail. Two pairs of wire access openings 26, 28 lead to profiled end cavities 30, 32, respectively, of recess 22. The cavities 30, 32 are interconnected by a narrow passage 34. A pair of spaced parallel walls 36, 38 define therebetween a slot 40 opening into the passage 34. An additional ground wire opening 42 is formed in one sidewall adjacent one end of the housing 10 to provide access for connection of a ground wire to the ground yoke 16. The housing is further provided at each end with locking detents 44 and with locking detents 46 in the central channel 20. Each contact member includes two basic terminal strip units 48, 50 joined together by a tear strip 52. Each basic terminal strip unit can function independently. The basic unit is comprised of a prong engaging section 54, 56 and a conductor engaging section 58, 60. Each conductor engaging section includes one or more insulation piercing slots 62, 64 and 66, 68.

The ground yoke member 16 includes a yoke frame 70. A fork shaped portion 72 extends normal to the plane of the yoke frame 70 and includes a ground wire receiving slot 74. A pair of ground contacts 76, 78 are assembled with the yoke frame and adapted to receive ground pins of plugs (not shown) inserted into the receptacle. The ends of the yoke include the conventional apertured mounting flanges 80, 82.

The back cover 18 is an integral member having identical conductor carrying members 84, 86, 88, 90 and a ground wire carrying member 92. Since the conductor carrying members are identical and the ground wire carrying member is substantially the same, only member 84 will be discussed in detail. Member 84 is attached to the cover 18 by flexible straps 94, 96. The walls of the cover at each side of the member form inclined surfaces 98, 100. The member includes a pair of oppositely directed, inclined grooves 102, 104 which, when the member is in the inserted position, as shown in FIG. 2, lie substantially in line with the inclined surfaces 98, 100 respectively. The member includes first and second blind bores 106, 108 and a transverse channel 110. The cover 18 further includes end locking lances 112 depending from each corner thereof for engaging detents 44 and a pair of central locking lances 114, as shown in FIG. 8, for engaging detents 46.

The subject duplex receptacle embodiment is assembled as follows: the contacts 12 and 14 are inserted into the respective recesses 22 and 24, the ground yoke assembly 16 is inserted into the central channel 20 and the back cover 18 is assembled with the housing by bringing the central 114 and end 112 locking lances into engagement with the corresponding locking detents 46 and 44, respectively.

The duplex receptacle is shown in FIG. 2 connected at the end of a run with the current carrying wires 116, 118 of cable 120 inserted into a first set of conductor carrying members 84, 90 and the ground wire 122 inserted into the separate ground wire carrying member 92. It should be here noted that the component is shown connected to an insulated cable but that separate wires passing through a conduit or any other similar arrangement of wires would be suitable. It should also be noted that the illustrated component is capable of connection with up to eight wires, however, the contacts, housing and cover can be adapted to handle any desired number of wires. It is not necessary to strip insulation from the ends of the separate conductors in order to make connection with the component.

Figures 4, 5, 6, 7:
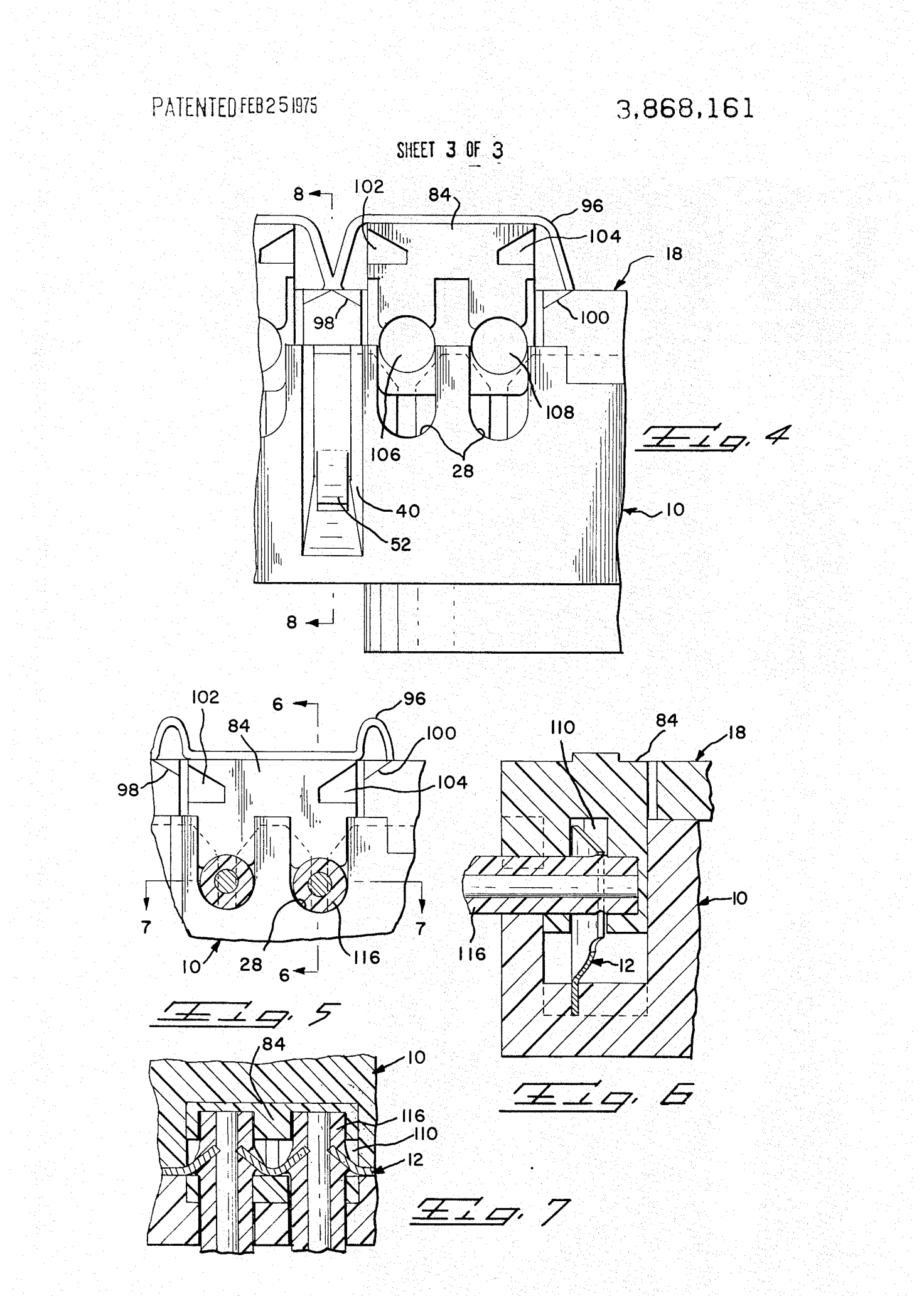

The details of the conductor carrying members will be described with reference to FIGS. 4 to 7. Each individual member 84 is integrally connected to the back cover by resilient straps 92, 94. These straps allow for relative movement of the member normal to the back cover while limiting the motion in either direction. Each member includes at least one blind bore 104, 106 into which the unstripped end of a wire is inserted. When the wire is inserted and the member is pushed into the housing, then the insulation of the wire will be cut from the conductor by the sides of the insulation piercing slot 66, 68 of the contact member 12, as best seen in FIG. 7, to form a good electrical connection. It should also be noted here that while solid conductors have been shown, the present invention is likewise suitable for use with stranded conductors since any movement of the separate wires forming the conductor would be restrained by the blind bores. When a member has wires inserted therein and is pushed into the housing, then it will be tightly held therein by the engagement of the wire with the contact member. However it is possible to remove the member for purposes of replacing or exchanging the wire. This is accomplished by inserting a screwdriver or like instrument into the groove at the upper end of the member and prying the member from the housing using the leverage from the adjacent inclined surfaces of the back cover.

The contact members can be separated into two individual units should it be desired to have individual sockets of the receptacle separately wired. In order to accomplish this, the pull tab 52 must be removed, see FIG. 3. The pull tab is struck from the contact member for only a short length thereof. The remaining portion of the contact member is not scored, indented, etc. and need not be since the walls 36, 38 of the housing serve as a pair of spaced parallel anvils which restrain the contact and allow the tear strip 52 to be removed simply by pulling the tab with a pair of pliers or like tool. The force required to make this separation is unexpectedly low and is in the range of 15 to 25 pounds for conventional 0.020 inch stock of a suitable metallic conductive material e.g. phosphor bronze, brass alloy, etc.

The present invention is subject to many modifications and changes without departing from the spirit or essential characteristics of the invention. The present embodiments are therefore to be considered in all respects as illustrative and not restrictive.

What is claimed is:

1. An improved electrical component comprising:
   a housing of insulating material having at least one cavity therein;
   at least one contact member received in said cavity of said housing and having at least one pair of spaced tines defining a wire engaging slot therebetween;
   a back cover including means detachably securing said back cover to said housing, at least one wire carrying member integrally connected to said back cover by flexible straps, said wire carrying member having therein at least one bore and a transverse groove intersecting said bore, whereby wire inserted in said bore is carried into engagement with said tines as said wire carrying member is moved towards said cavity with respect to said back cover.

2. An electrical component according to claim 1 wherein said bore is a blind bore limiting penetration of wire into said wire carrying member.

3. An electrical component according to claim 1 wherein
   each said at least one contact member includes a pair of like contact units joined together by a tear strip portion;
   said housing including a pair of spaced sidewall portions defining therebetween a slot exposing said tear strip portion whereby said tear strip can be removed from said contact member by being pulled through said slot against said spaced sidewall portions which serve as anvils.

4. An electrical component according to claim 1 further comprising:
   a ground yoke mounted within said housing, said ground yoke including a pair of spaced tines defining a ground wire receiving slot therebetween and at least one ground prong receiving portion; and
   a ground wire carrying member including a bore, a transverse groove intersecting said bore and integral flexible straps connecting said ground wire carrying member to said cover whereby a ground wire inserted into said bore is driven into said ground wire receiving slot of said ground yoke by movement of said ground wire carrying member into said cavity with respect to said back cover.

5. An improved electrical component according to claim 1 wherein said component is a duplex receptacle.

6. An improved electrical component according to claim 1 wherein said component is a switch.

7. An improved electrical component according to claim 1 wherein said component is a light fixture.

8. An improved electrical component according to claim 1 wherein said component is a bus bar.

9. An improved electrical component according to claim 1 wherein said component is a junction box.

10. An improved electrical component according to claim 1 wherein said component is a splice.

11. An improved electrical component comprising:
    a housing of insulating material having therein at least one cavity and at least one pair of spaced sidewall portions, each pair defining therebetween an elongated access slot communicating with said at least one cavity;
    at least one contact member mounted in said at least one cavity, each said contact member including a pair of like contact units interconnected by a tear strip portion aligned to be accessible through said slot in said housing and coplanar with said sidewalls, said tear strip portion having a tab extending into said slot and said slot extending substantially transversely across said contact and beyond both lateral edges thereof;
    said tear strip adapted to be removed by application of a unidirectional pulling force normal to the plane of said contact member whereby said side wall portions serve as anvils for restraining the contact units of said contact member and cause the tearing separation of said strip from said contact member.

12. An electrical wiring receptacle comprising:
    a housing of insulating material having at least a pair of cavities therein and a pair of spaced sidewall portions on at least one side of each cavity, each pair of sidewall portions defining a slot therebetween communicating with the adjacent cavity;
    at least one contact member mounted in each said cavity, each said contact member including a pair of like end contact units joined together by a tear strip portion, said tear strip portion being accessible through said housing sidewall slot, each said contact unit including at least one pair of tines defining a wire engaging slot therebetween; and
    a back cover including means to secure said cover to said housing and at least one wire carrying member for each contact member, each said wire carrying member having flexible arm means integrally attaching said wire carrying member to said back cover and at least one bore intersected by a transverse slot, said wire carrying member being in substantial alignment with a respective one of said contact members so that said tines can enter said transverse slot, whereby a wire inserted into said bore will be carried into engagement with said tines by pushing said wire carrying member into said housing.

13. An electrical wiring receptacle according to claim 12 further comprising:
    a ground yoke mounted substantially centrally within said housing, said yoke including a pair of tines defining a ground wire engaging slot therebetween and at least one ground prong receptacle; and
    said back cover including a ground wire carrying member attached to said cover by flexible arm means, said ground wire carrying member including a bore and a transverse slot intersecting said bore and being in substantial alignment with said ground wire tines whereby a wire inserted into said bore can be driven into engagement with said tines.

14. An electrical wiring receptacle according to claim 13 wherein said ground yoke further comprises means adapted to fixedly mount said receptacle.

15. An electrical wiring receptacle according to claim 13 wherein said back cover includes a wire carrying member aligned with each pair of tines of each contact unit.

* * * * *

UNITED STATES PATENT OFFICE
CERTIFICATE OF CORRECTION

PATENT NO. : 3,868,161
DATED : February 25, 1975
INVENTOR(S) : ROBERT HOUSTON FRANTZ It is certified that error appears in the above-identified patent and that said Letters Patent are hereby corrected as shown below:

In the Patent:

Claim 12, column 6, line 49, after "for each" insert - - - said - - - .

Signed and sealed this 22nd day of April 1975.

(SEAL)
Attest:

RUTH C. MASON
Attesting Officer

C. MARSHALL DANN
Commissioner of Patents
and Trademarks